United States Patent
Kulakowski

(10) Patent No.: US 8,965,789 B2
(45) Date of Patent: Feb. 24, 2015

(54) METHOD FOR AUTHORIZATION OF A TRANSACTION WITH THE USE OF MOBILE PHONE

(75) Inventor: Henryk Kulakowski, Jaroszowa Wola (PL)

(73) Assignee: Masspay SP. Z O.O., Jaroszowa Wola (PL)

( * ) Notice: Subject to any disclaimer, the term of this patent is extended or adjusted under 35 U.S.C. 154(b) by 64 days.

(21) Appl. No.: 13/320,433

(22) PCT Filed: May 12, 2010

(86) PCT No.: PCT/PL2010/000034
§ 371 (c)(1), (2), (4) Date: Nov. 14, 2011

(87) PCT Pub. No.: WO2010/131988
PCT Pub. Date: Nov. 18, 2010

(65) Prior Publication Data
US 2012/0078737 A1  Mar. 29, 2012

(30) Foreign Application Priority Data

May 12, 2009 (PL) .......................................... 388012
May 12, 2010 (PL) .......................................... 391203

(51) Int. Cl.
*G06Q 30/06* (2012.01)
(Continued)

(52) U.S. Cl.
CPC ............ *G06Q 20/20* (2013.01); *G06Q 30/0613* (2013.01); *H04L 63/102* (2013.01); *H04L 63/18* (2013.01); *H04W 12/06* (2013.01); *H04W 4/14* (2013.01)
USPC .......................................... 705/16; 705/26.41

(58) Field of Classification Search
CPC .. G06Q 30/0613; H04L 63/102; H04L 63/18; H04W 12/06; H04W 4/14
USPC ................................................ 705/16, 26.41
See application file for complete search history.

(56) References Cited

U.S. PATENT DOCUMENTS 6,764,003 B1 * 7/2004 Martschitsch et al. ........ 235/383
(Continued)

FOREIGN PATENT DOCUMENTS

EP 0986275 A1 3/2000
(Continued)

OTHER PUBLICATIONS

Magex launches new mobile payment solutions. (2002). Telecomworldwire, , 1. Retrieved from http://search.proquest.com/docview/190932004?accountid=14753.*
(Continued)

*Primary Examiner* — Scott Zare
(74) *Attorney, Agent, or Firm* — Andrew M. Calderon; Roberts Mlotkowski Safran & Cole, P.C.

(57) ABSTRACT

A method for transaction authorization with the use of a mobile phone, comprising the steps of receiving (102, 202) from the user (UR), by the communication server (CS) a voice call establishment request, to establish a voice connection to a telephone number which identifies a transaction; authorize the transaction by verifying (112, 206) the credentials of the user (UR); accepting (106, 214) or rejecting (108, 216) the voice call; sending a request (116, 220) to the user (UR) to enter necessary transaction parameters; entering (118, 222) the requested transaction parameters; verifying (120, 224), by the authorization system (AS), the validity of the entered parameter; determining (122, 226) whether the user (UR) has entered all necessary transaction parameters, including user's authorization to fund the transaction and, preferably, a password authorizing the transaction; accepting the transaction funding by the transaction party responsible for it (124, 228), and, if the amount has been accepted, sending a message with instruction to reserve sufficient funds (126, 230) in the transaction funding party account to settle the transaction; determining (128, 232) whether the authorization system (AS) has been provided with all necessary the transaction parameters; storing (130, 234) the transaction for further processing or forwarding it (132, 236) for settlement.

26 Claims, 4 Drawing Sheets

(51) Int. Cl.
G06Q 20/20 (2012.01)
H04L 29/06 (2006.01)
H04W 12/06 (2009.01)
H04W 4/14 (2009.01)

(56) References Cited

U.S. PATENT DOCUMENTS

| | | | |
|---|---|---|---|
| 7,478,065 B1 * | 1/2009 | Ritter et al. | 705/39 |
| 7,720,709 B1 * | 5/2010 | Langer et al. | 705/16 |
| 8,107,953 B2 | 1/2012 | Zimmerman et al. | |
| 8,208,442 B2 | 6/2012 | Mahdi et al. | |
| 2008/0103984 A1 * | 5/2008 | Choe et al. | 705/76 |
| 2008/0154735 A1 * | 6/2008 | Carlson | 705/16 |
| 2008/0177662 A1 | 7/2008 | Smith et al. | |
| 2012/0058753 A1 | 3/2012 | Kulakowski | |

FOREIGN PATENT DOCUMENTS

| | | | | |
|---|---|---|---|---|
| EP | 1150479 | A2 | 10/2001 | |
| EP | 1471755 | A1 | 10/2004 | |
| WO | 02/10086 | A2 | 2/2002 | |
| WO | 2004-049271 | A2 | 6/2004 | |
| WO | WO 2004049271 | A2 * | 6/2004 | G06F 7/00 |
| WO | 2005-060282 | A1 | 6/2005 | |

OTHER PUBLICATIONS

Digital Cellular Telecommunications System (Phase 2+); Universal Mobile Telecommunications System (UMTS); LTE; Unstructured Supplementary Service Data (USSD); Stage1 (3GPP TS 22.090 version 8.0.0 Release 8); ETSI TS 122 090 v8.0.0, Jan. 1, 2009.

USSD Services for Interactive Mobile Users—Building User-Friendly Mobile telephone Applications Using Dialogic Distributed Signaling Interface Components, Dialogic Making Innovation ThriveTM, XP-002528245; Aug. 31, 2008.

International Search Report PCT/PL2010/000034, mailed Oct. 26, 2010.

PCT Notification of Transmittal of the International Search Report and the Written Opinion of the International Searching Authority, or the Declaration, mailed Oct. 26, 2010.

International Search Report of PCT/PL2010/000035 mailed on Oct. 26, 2010.

Notice of Allowance dated Dec. 23, 2013 for U.S. Appl. No. 13/320,457; 10 pages.

* cited by examiner

METHOD FOR AUTHORIZATION OF A TRANSACTION WITH THE USE OF MOBILE PHONE

CROSS-REFERENCE TO RELATED APPLICATIONS

The present Application is a US national phase of PCT/PL2010/000034 filed on May 12, 2010 ("PCT Application"), which claims priority from Polish Application No. P-388012 filed on May 12, 2009 and Polish Application No. P-391203 filed on May 12, 2010, all of which are hereby incorporated by reference in their entirety into the present Application.

FIELD OF THE INVENTION

The present invention relates generally to financial services, particularly to methods for executing payments with the use of mobile phones.

STATE OF THE ART

There are known methods for performing payment transactions with the use of mobile phones. Among them there are methods invented by the Applicant of the present invention filed with The Polish Patent Office under the numbers of P-357402, P-357403, P-363338. The first commercial mobile payments service in Poland, the mPay service, has been successfully implemented based on those methods. That solution is based on the un-tariffed USSD service (Unstructured Supplementary Service Data), and requires close co-operation from the Mobile Network Operator (MNO), inter alia, to have a uniform non-standard USSD numbering system available. Another problem with the USSD channel is a limited range of its numbering system, that limits the range of possible applications that could take advantage of the service. Finally, the last issue is the very format of the numbering system which is not intuitive and, therefore, not always clear for users.

There are implementations of mobile payments systems that use SMS messaging, which do not require explicit co-operation from the MNO. However, they do not offer the level of security and/or reliability that is desired for financial services.

Also, there are solutions that use the voice channel for mobile payments, or the voice channel along with the SMS technology, which is used, inter alia, in the PayPal mobile service. However, solutions of this type have not gained wide adoption, because of the long transaction execution time (in particular a need to wait for a call back) or problems with transmission of a sequence of digits during a voice session, or the transaction funding in the payment services is limited to the internal accounts of the payment system.

The data transmission service, which seems to be best suited for performing payment services or authorization services on any mobile phone model, is the USSD (Unstructured Supplementary Service Data). The fundamental advantage of this service is that a logical end-to-end session is established between a user's phone and a server for exchanging text messages. Once the session is established, the messages are exchanged virtually in real time. If, for whatever reasons, the session is not established, (e.g., due to the network overload) no messages are exchanged at all. USSD service allows therefore to determine unequivocally and promptly, whether a connection can be established and messages can be exchanged. Another advantage of this service over SMS is that the data exchange session leaves no traces or residual data (like an SMS message) in the phone memory. Therefore the security of the communication is improved, which is particularly important in the case of exchanging PIN codes or other important financial data. Unfortunately, the USSD service suffers from two serious drawbacks. A session with a server is established from the user's phone in response to the user dialing a sequence in a format of *1XX*NNNN#, where XX is a short code in the range of 00-99. The relatively narrow range of short codes (maximum of 99) does not allow offering services of a large variety and sophistication. Of course, the digits that follow the short code (NNN) may be used for additional service identification, however, identifying such a service becomes more complicated (e.g., *134*145#). Another issue with the latter approach is the fact that such a query/command (unlike e.g. SMS based commands) may be used only within the user's home network, i.e., the services can't be offered to users of other networks unless they are located, in roaming conditions, within the network in which the service will be performed. Still another problem with the USSD service is its lack of support on the CDMA networks in which case the SMS technology is necessary for performing payments or related authentication/authorization functions resulting in lesser service quality.

Existing solutions are related to particular implementations of mobile payments. Practically, there are no known ways of using mobile phones for typical transaction authorization purposes.

SUMMARY OF THE INVENTION

In its first aspect the present invention encompasses a method for transaction authorization with the use of a mobile phone. The user initiating the transaction and the transaction to be authorized are identified by unique telephone (MSISDN) numbers assigned to them in the authorization system. The user authorizing the transaction initiates a voice channel session from his/her phone with the telephone number that identifies the transaction to be authorized. The connection request arrives at the authorization system, where it is serviced by a communication server. The communication server performs the identification of the telephone number of the user authorizing the transaction and the number of the transaction being authorized which was dialed by the user. Based on the identified telephone numbers and the data attributed thereto in the communication server database, the communication server determines whether the transaction is to be authorized via the voice connection or the text message exchange. In the case of a voice connection the server accepts the incoming call request and establishes a voice telephone call. In the case of a request for transaction authorization with the use of text message exchanges, the voice call request is rejected and the following communication with the user authorizing the transaction is carried out by means of USSD or SMS message exchange. In some cases it may be preferable to establish an instantaneous voice connection, and then to close it. This is due to the fact that network components often interpret the voice call establishment request rejection codes arbitrarily and often erroneously. At the same time, the numbers of the user authorizing the transaction (calling MSISDN) and of the transaction being authorized (called MSISDN) are sent by the communication server to the authorization system, which identifies the user and the transaction, and verifies whether the transaction indicated by the user may be authorized by him. If the verification produces a negative outcome, a relevant voice or text message is sent to the user. Otherwise, in subsequent steps the user enters the transaction parameters required by the authorization system, the correctness of which is verified by the system in real time. Then, the system determines whether all necessary transaction parameters have been obtained. If the authorization system does not have all the necessary transaction parameters, it sends a request to the user authorizing the transaction to complete providing them. Once the user enters the necessary transaction parameters, the verification procedure is performed to determine whether the authorization system has all parameters necessary to authorize and settle the transaction. If the amount of the charge is known and accepted by the payer, a message is sent to reserve the transaction amount on the payer's account. For the duration of executing—all of the transaction steps (including confirming the transaction amount by the payer and payee) the transaction is stored in the system with a pending status. Once the authorization system completes all steps required, including the successful authorization by both parties and the consent to settle the transaction, the transaction is forwarded to the settlement system for further processing.

The method comprises steps of receiving, by the communication server of the authorization system, a voice call establishment request for a voice connection to the phone number of the transaction being authorized, and then accepting or rejecting the voice call request, if the call request is determined to be a request for the transaction authorization based on text message exchange. In subsequent steps, information about the incoming call request is transmitted from the communication server to the authorization system, the information including at least the telephone number of the terminal initiating the connection (calling MSISDN) along with the dialed destination number (called MSISDN), and then all the necessary transaction parameters are entered and verified. Once the transaction parameters are verified and the authorization of both parties is successful, the funds are reserved in the source account, and assuming that all the necessary transaction parameters provided, the transaction is forwarded to the settlement system for further processing.

In the second aspect, the present invention encompasses a telecommunications network comprised of an authorization system and a communication server adapted for servicing the transaction authorization procedures with the use of a voice connection, SMS message exchange, and/or USSD message exchange. The communication server is adapted to receive a voice call establishment request for a voice connection with the phone of the user authorizing the transaction and to accept or reject this voice call establishment request based on the determination if the request is for services based on voice or data (i.e. USSD or SMS) communication. The communication server is also adapted to transmit, to the authorization system, the information about the incoming call request, comprising at least the telephone number of the user authorizing the transaction (calling MSISDN) and the number of the transaction being authorized (called MSISDN), and to transmit the information between the authorization system and the user authorizing the transaction in order to receive and verify the transaction parameters.

Other elements of this invention are described in dependent claims.

BRIEF DESCRIPTION OF DRAWINGS

The invention is further explained with reference to the accompanying drawings in which.

DETAILED DESCRIPTION

The present invention, in its various embodiments, allows a user to authorize a transaction with the use of a mobile phone of any type with use of standard services available in a telecommunications network. No additional software application is required to be installed on the mobile phone to perform this service, the service may be accessed from any telecommunications network, and account debit as well as account credit transactions can be authorized. The service can function as a pre-authorization procedure, if all parameters required for full authorization are not known, and as a full authorization procedure, which allows to complete the transaction and forward it for settlement.

Figure 1:
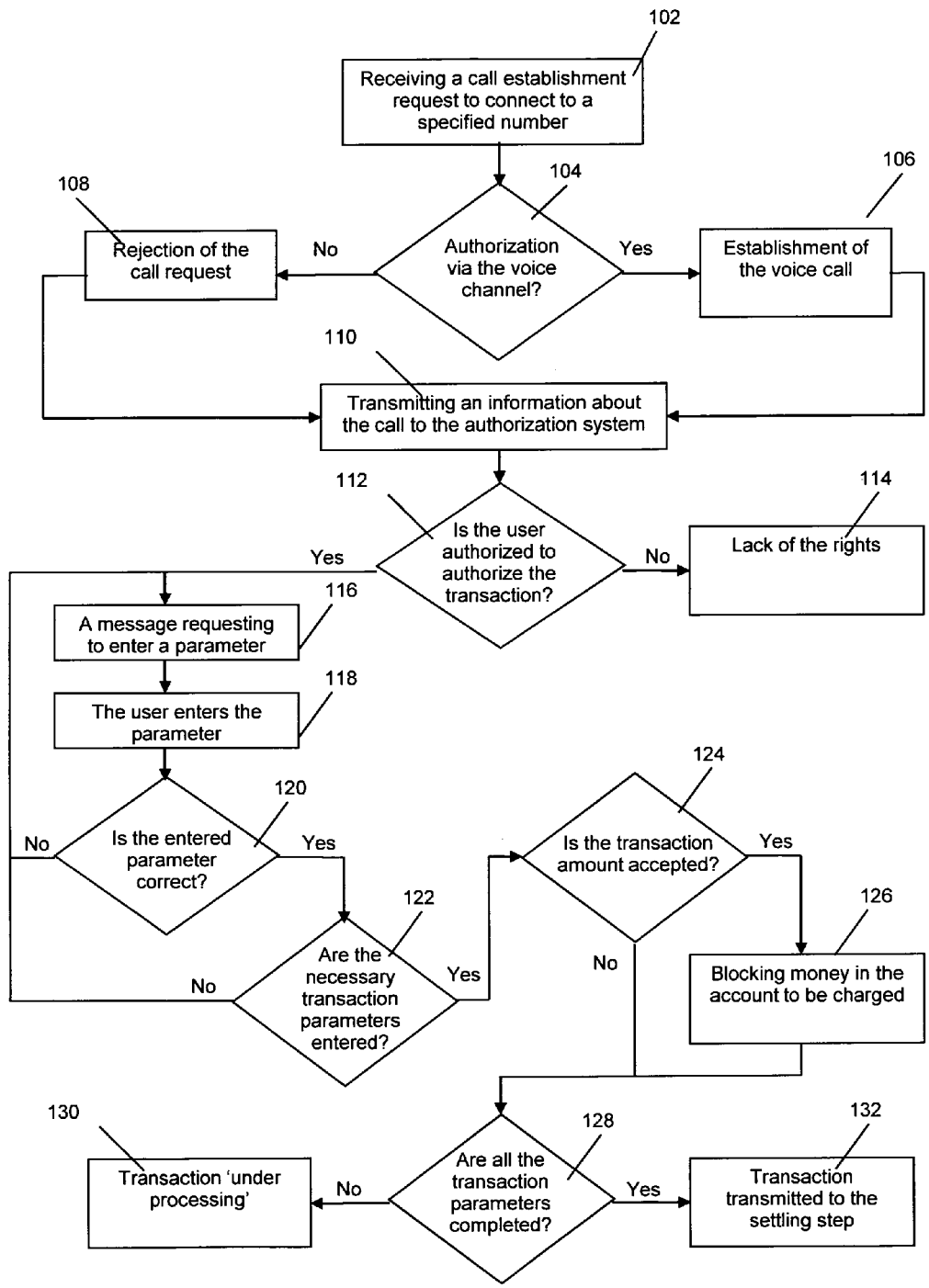
FIG. 1 shows a method for performing a service in a telecommunications network in the first embodiment of the present invention.
Figure 2:
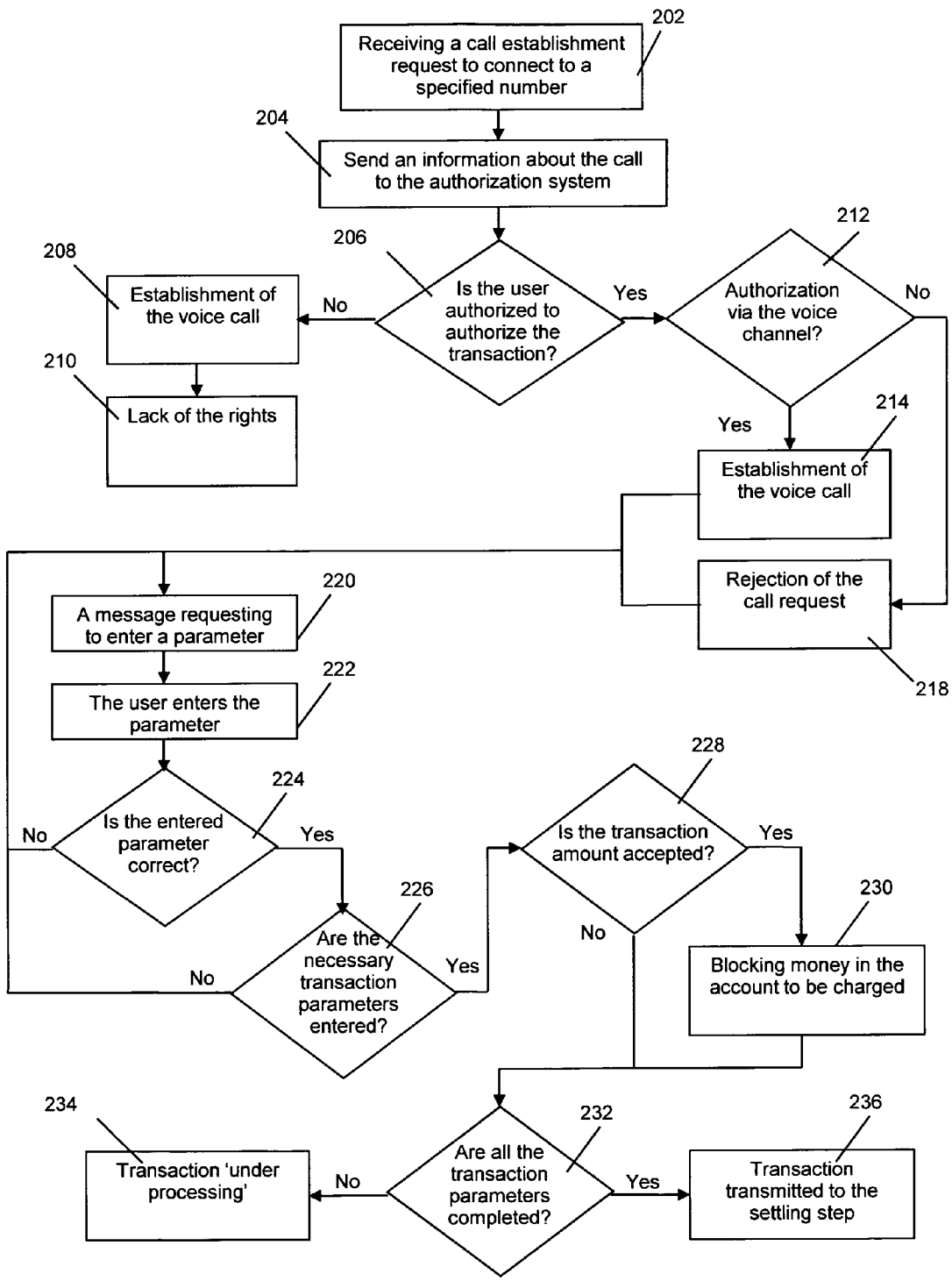
FIG. 2 shows a method for performing a service in a telecommunications network in the second embodiment of the present invention.

FIGS. 1 and 2 show methods for implementing the transaction authorization with the use of mobile phone in one embodiment of the present invention. The type of the transaction to be authorized and its settlement method are not the subject matter of the invention. Embodiments of particular services are included further in this description.

In the first method, shown in FIG. 1, a communication server CS (shown in FIGS. 3, 4, and 5) receives, 102, a voice call establishment request from a user UR to a telephone number that identifies the transaction being authorized. The communication server CS identifies the user telephone number and based on that determines, 104, whether the authorization is to be performed via a voice call, it establishes a voice call, 106, if that is the case or rejects the voice call, 108, in the opposite case. Then, the communication server CS transmits, 110, the information about the call to the authorization system AS, which verifies, 112, whether the user UR has the rights to authorize the transaction under consideration, and, if the verification result is negative, it sends 114, a message to the user UR via the communication server CS to inform the user UR about the negative result of the verification. If the outcome of the verification, 112, is affirmative, the authorization system AS sends, via the communication server CS, a request, 116, to the user UR to enter, 118, a particular transaction parameter, which is then verified, 120, for correctness by the authorization system AS. If the outcome of the verification, 120, of the parameter is negative, the authorization system AS requests, 116, to enter the parameter once again. If the outcome of the verification, 120, is affirmative, the authorization system AS determines, 122, whether the user UR has provided all the parameters necessary for transaction authorization. If some necessary parameters are lacking, a request is sent to the user UR, 116, to complete entering the missing parameters. Once it is confirmed, in the verification step, 122, that the user UR has entered all the necessary transaction parameters, a verification step is performed, 124, to determine whether the party to be charged has accepted the transaction amount, and, if affirmative message is sent, 126, with instructions to reserve appropriate amount in user's account. Preferably, the amount is reserved in an account managed by an external financial services institution. Next, the authorization system AS determines, 128, whether all transaction parameters have been provided (including those requested by the other party participating in the transaction). If all transaction parameters have been provided the transaction is forwarded, 132, for settlement; otherwise it is saved in storage, 130, as a transaction "in progress". Preferably, the transaction settlement is carried out by the software system that also includes the authorization function and thus constitutes a complete authorization/settlement module. Preferably, the transaction authorization and settlement procedures are performed against external accounts, e.g., bank accounts or payment card accounts. That eliminates the need for payment accounts directly present in the authorization system. If the authorization and settlement procedures are performed against external accounts, appropriate messages are sent to their respective management systems that contain fund management instructions. Transaction settlement is a separate procedure of transferring funds between the accounts and appropriate management of financial liabilities of the parties of the transaction and it is not a subject matter of the invention.

In the second embodiment shown in FIG. 2, the communication server CS receives, 202, a voice call establishment request from the user UR to the number identifying the transaction being authorized. The information about the incoming call is transmitted, 204, to the authorization system, which verifies, 206, the rights of the user UR to authorize the transaction. In the case of negative outcome of the verification, 206, a voice connection is established, 208, and a message is played to inform the user UR about the negative outcome of the verification. In the case of affirmative outcome of the rights verification, 206, a further verification is performed, 212, to determine whether the transaction authorization is to be performed via the voice channel, in which case a voice connection, 214, is established, whereas in the opposite case the voice call establishment request is rejected, 218. In the next step, the authorization system AS sends, by means of the communication server CS, a request, 220, to the user UR to enter a specified transaction parameter, which, after being entered, 222, by the user UR and transmitted to the authorization system AS by means of the communication server CS, is verified, 224, by the authorization system AS for its correctness. If the outcome of the parameter verification, 224, is negative, the authorization system AS once again requests, 220, the parameter. If the outcome of the verification, 224, is affirmative, the authorization system AS determines, 226, whether the user UR has provided all the parameters necessary for transaction authorization. If some necessary parameters are lacking, a request is sent to the user UR, 220, to complete entering the missing parameters. Once it is confirmed in the verification step, 226, that the user UR has entered all the necessary transaction parameters, a step is performed to determine, 228, whether the payer has accepted the amount of the transaction. The affirmative outcome results in a message being sent, 126, with instructions to reserve the appropriate amount on the payer's account. Preferably, the funds are reserved in the external account managed by a specialized financial institution. The authorization system AS verifies, 232, whether, all the transaction parameters have been provided, including the parameters requested from the other party participating in the transaction. If all transaction parameters have been provided the transaction is forwarded, 236, for settlement; otherwise it is saved in storage, 234, as a transaction "in progress".

If the communication server CS has verified, 104, 212, that the transaction authorization is to be performed via a voice connection, then, once this connection is established, 106, 214, exchange of messages between the authorization system AS and the user UR via the communication server CS is performed in the voice channel. In the opposite case, if the communication server CS has verified, 104, 212, that the transaction authorization is to be performed with the use of text messages, the communication server CS rejects 106, 218 the voice call establishment request and the whole communication between the authorization system AS and the user UR via the communication server CS is performed with the use of SMS or USSD messages.

Figure 3:
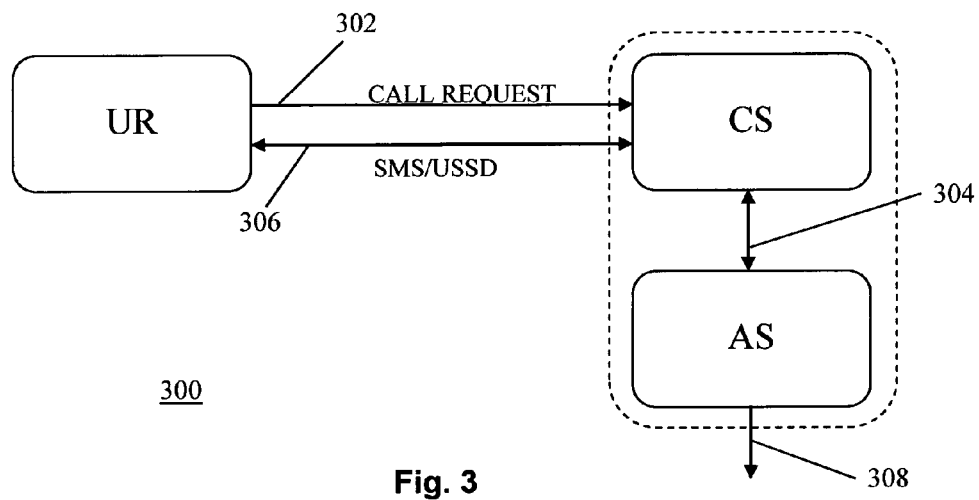
FIGS. 3-5 shows the telecommunications network in different embodiments of the present invention.

FIG. 3 shows an embodiment of the present invention in a telecommunications network, used for performing a service of authorizing transactions with the use of a mobile phone. In the present invention, a user UR dials a telephone number that identifies the transaction being authorized, which results in a voice call establishment request, 302, CALL REQUEST, arriving at a communication server CS, and the communication server CS rejects this call request and transmits, 304, information about this call to the authorization system AS. The authorization system AS communicates, 306, with the user UR via the communication server CS by means of SMS text messages or USSD messages. Once the transaction authorization procedure is completed, the authorization system AS forwards, 308, the transaction for settlement.

Figure 4:
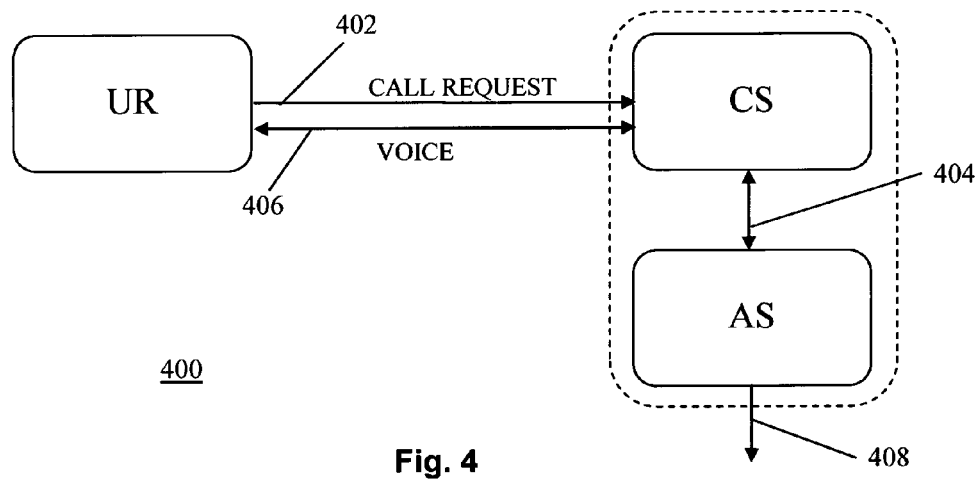

In another embodiment shown in FIG. 4 the user UR, in order to authorize a transaction, dials a telephone number which results in a voice call establishment request, 402, CALL REQUEST, arriving at a communication server CS. This request is accepted and a voice connection is established, 406, by means of which communication between the authorization system AS and the user UR is performed, via the communication server CS connected, 404, to the authorization system AS for the purpose of confirming and verifying the transaction parameters. Once the transaction parameters have been confirmed, the authorization system AS forwards, 408, the transaction for settlement.

In examples, from FIG. 3 as well as FIG. 4, when the call establishment request, CALL REQUEST, arrives at the communication server CS, the information about the request can be transmitted, 304, 404, to the authorization system AS for user's UR rights verification. In the case of a negative outcome of the verification of the user's rights, AR instructs the CS to accept the voice call request in order to play a voice message informing the user UR about the negative outcome of rights verification, whereas in the case of a affirmative outcome of the user's rights verification the call request is rejected, as in FIG. 3, or accepted, as in FIG. 4.

Figure 5:
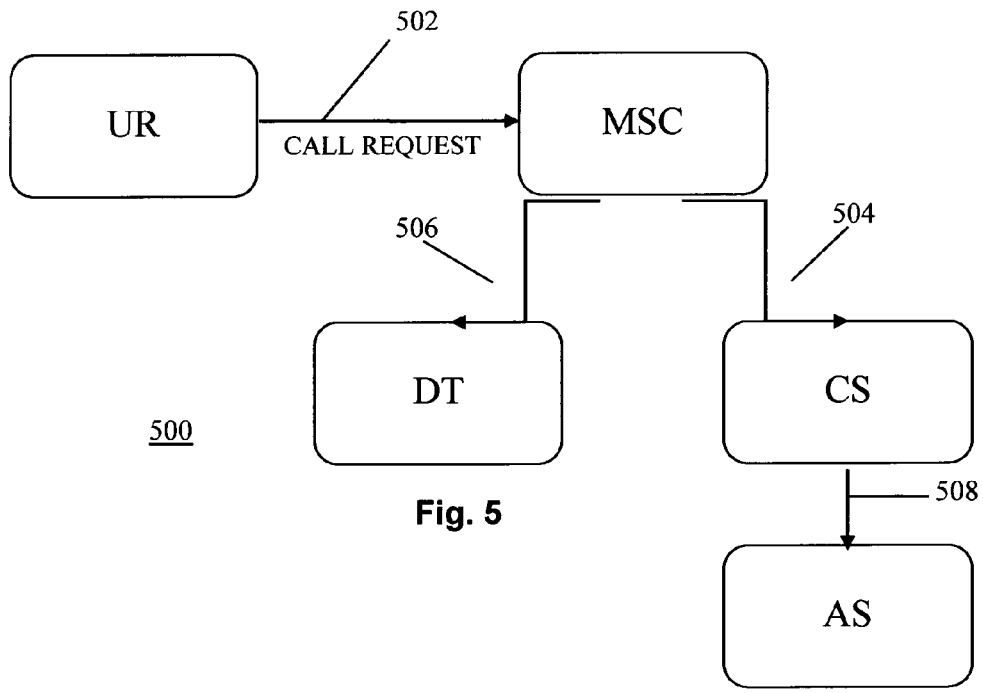

The telephone number dialed by the user UR, that identifies the transaction, may vary for various transactions, or it may be the same (single) number for each particular party offering a product or service, e.g., a merchant/seller, fund transfer beneficiary, box office, or a website. The number dialed by the user UR can also include transaction parameters, which can be embedded in the standard telephone number, or are entered as an extension of the number and can be separated by the "*" or "#" characters. Preferably, the dialed number that identifies the transaction is a standard telephone number typically used for establishing a voice call, is modified by inclusion of additional parameters, in particular the "*" or "#" characters, and is treated by the telecommunications network as a transaction authorization request. Instead of establishing a voice connection with the network attached terminal associated with this number, the telecommunications network transmits the call establishment request to the communication server CS in order to service a transaction, one party of which is identified by this telephone number. An implementation of such a solution is shown in FIG. 5. The voice call establishment request, 502, coming from the user UR, arrives at a telephone exchange MSC of the network operator, in which the dialed number is verified, and, if the request is to be serviced as a standard voice call, it is transmitted, 506, to the appropriate terminal or network node, DT, and then an ordinary voice call is established. If the incoming call is recognized as a call to service a transaction, it is transmitted, 504, to the communication server CS, which in turn transmits, 508, the information about this call to the authorization system AS.

Figure 6:
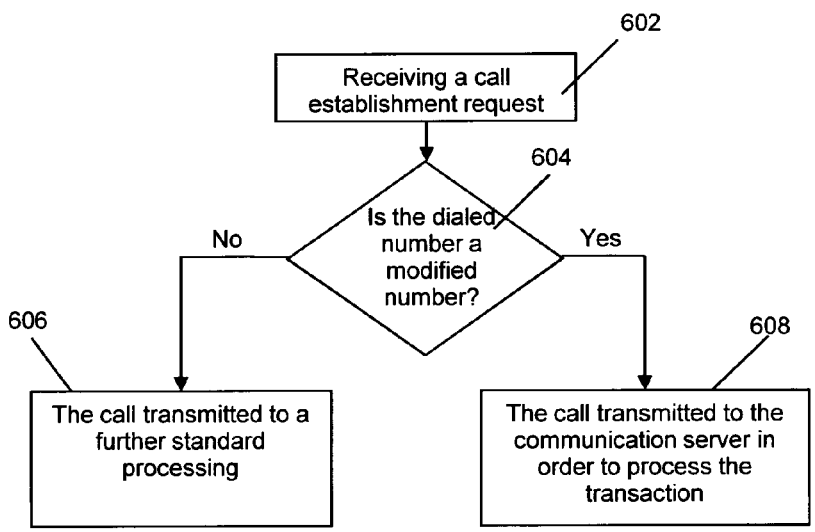
FIG. 6 shows a method for servicing a voice call establishment request in the telephone exchange of a telecommunication operator.

FIG. 6 shows a method for servicing a voice call establishment request in a telephone exchange of the telecommunication operator. Once the exchange MSC receives the request, 602, the number dialed by the user is analyzed, 604, for its length, and, if it is a standard MSISDN number, the request is transmitted to be processed by a subsequent element of the telecommunications network. If the dialed number is an extended number and/or it contains a special character "*" or "#", the call establishment request is treated as a request for the transaction authorization and it is transmitted, 608, to the communication server CS, which, in turn, transmits, 508, the information about the call to the authorization system AS.

FIGS. 3, 4, and 5 show a telecommunications network 300, 400, 500 in various embodiments of the present invention. The user UR uses a telephone terminal in a mobile telephony network, adapted for performing voice connections and for exchanging SMS messages, and, preferably, USSD messages. Calls coming from the user UR are serviced by the exchange MSC, which transmits them to the communication server CS of the authorization system AS. The communication server CS is adapted for servicing voice connections and exchanging SMS and USSD messages. For the purpose of using modified telephone numbers for transaction authorization, the exchange MSC is adapted for identifying such calls as the transaction servicing calls and for transmitting them to the communication server CS. In the case of using only the standard numbering system for transaction authorization, no modification of the exchange MSC is needed.

Examples of transaction authorization with the use of a mobile phone, according to the present invention, are presented below.

Example 1

The user UR has a mobile phone with USSD messaging support, and the mobile phone number is registered with the authorization system AS to be authorized to perform payment transactions. Pre-registration of the user UR in the authorization system AS is necessary and it is verified in steps 112 and 206 in FIGS. 1 and 2. The user UR makes a purchase at an Internet store. The last step in the purchase process is the payment. On the store website the digits of the telephone number are displayed. The number may also be displayed in a graphical form encoded in a photocode. The user UR manually dials the number on the handset keypad or, in an alternative embodiment, uses a software application installed on the user's phone that reads the photocode displayed on the website and decodes the photocode to retrieve and dial the number. Dialing the number results in sending a call establishment request, 302, to the telecommunications network, which is received, 102, by the communication server CS. Based on the data present in its database, the communication server CS determines, 104, that the transaction authorization will be performed with the use of message exchange via the USSD channel, rejects, 108, the voice call establishment request, and then transmits, 110, the information about the incoming call request to the authorization system AS. The authorization system AS confirms, 112, the rights of the user UR to authorize the transaction, and sends, 116, a message to the communication server CS, containing the information about the transaction and a request for authorisation from the user, which are subsequently delivered to the user, 306, in a USSD message exchange. The user UR authorizes the transaction by entering, 118, the PIN code as a transaction parameter. The authorization system AS verifies, 120, the PIN code entered by the user against its database and then determines, 122, whether the user UR has entered all expected transaction parameters. Then, the authorization system AS determines, 124, whether the transaction party, whose account is to be debited (the user UR in this example), has accepted the amount of the transaction, and, if that is affirmative, a message is sent with instructions to reserve the amount, 126, on the bank account. Since the PIN code was the only required and requested transaction parameter, once the PIN code verification step is completed, 128, the transaction is forwarded further for settlement, 32.

Example 2

The user UR is the owner of a mobile phone with a number which is not registered in the authorization system; AS wants to make a purchase of a beverage from a vending machine. The user UR dials on the mobile phone, a number which is associated with the transaction and, e.g., displayed on the vending machine. Dialing of the number results in a voice call establishment request being sent, 302, to the telecommunications network, which is received by the communication server CS. The communication server CS transmits, 204, the information about the voice call establishment request to the authorization system AS, which verifies, 206, in this case with a negative outcome, the rights of the user UR, completes the voice call establishment, 208, and uses the voice call to transmit a message, 210, about the user's insufficient rights to use the system.

Example 3

The user UR, wants to transfer, with the use of user's mobile phone, the amount of PLN 20 from user's electronic wallet account to a person identified by a telephone number 1234567. The user UR dials, the sequence 1234567*20 on the phone. A call establishment request, 502, is sent to the telephone exchange MSC. The MSC exchange receives, 602, a call establishment request, and, based on the fact, 604, that this is a modified telephone number with an embedded "*" character "*", recognizes it as a transaction service request and transmits it, 504, 608, to the communication server CS. The communication server CS receives, 102, the call establishment request, and determines, 104, that the transaction authorization will be performed with the use of SMS messages, rejects, 108, the call request, and sends the information about the call being serviced to the authorization system AS. The authorization system AS determines whether the user UR is registered within the authorization system AS and verifies, 112, the rights of the user. Once the rights of the user UR are verified the authorization system AS transmits to the user information about the transaction and a request, 116, to accept/allow the transaction. The user UR accepts the transaction by providing user's PIN code. The authorization system AS verifies, 120, the acceptance of the transaction (i.e., confirms the correctness of the PIN code), and then it verifies, 122, whether the user UR has provided all required transaction parameters (e.g., whether the transaction amount is known). Next, the authorization system AS determines, 124, whether the transaction party, whose account is to be debited (the user UR account in this example), has accepted the amount of the transfer, and, if that is affirmative, a message is sent with instructions to reserve the amount, 126, on user's electronic wallet account maintained by the authorization system AS. Next, the authorization system AS determines, 128, whether all parameters, necessary for transaction settlement are known, (e.g., whether the consent from the transfer recipient has been received), and forwards the transaction for settlement, 132.

Example 4

The user UR makes a purchase of footwear via TV shopping. A particular telephone number is assigned to the product. The user UR dials the number, visible on the screen, which results in a voice call establishment request, 402, being sent for a connection to this particular number. The request is received, 102, by the communication server CS, which determines, 104, that the transaction will be performed with the use of the voice channel, and establishes, 106, 406, a voice call. The information about the call request being serviced is sent, 110, to the authorization system AS, which, after the verification, 112, of the user's rights, sends a request to the user, 116, to enter the footwear size. This parameter, once entered by the user, 118, is verified, 120, by the merchant/seller, for product availability in the requested size. If the product is not available in the requested size, a request is sent to the user UR, 116, to enter another size, after which, 188, the verification procedure is repeated, 120. In the subsequent step, the authorization system AS determines, 122, whether all expected transaction parameters have been entered, and sends a request, 116, to authorize the transaction with a PIN code. The user UR enters, 118, the PIN code, which is verified, and then a subsequent verification step is performed, 122, to determine whether the user UR has given all necessary transaction parameters. Then, the authorization system AS determines, 124, whether the transaction party, whose account is to be debited (the user UR in this example), has accepted the transaction amount, and, if that is affirmative, a message is sent with instructions to reserve the amount, 126, on user's bank account. Then, the authorization system AS verifies, 128, that all transaction parameters are known (e.g., whether the transaction has been accepted by the seller, whether the transaction amount is specified, etc.), and forwards the transaction for settlement, 132.

Example 5

The user UR, using an NFC (Near Field Communication) compatible mobile phone makes a payment at a box office. The payment is identified by a telephone number printed on a passive sticker with embedded RFID technology or made visible on an active RFID display, wherein the number is also stored in electronic form. The transaction will result in a payment card account (linked by the authorization system AS to the user's mobile telephone number) being charged. To execute the transaction, the user UR waves the telephone handset near the RFID sticker, from which the said telephone number is read by the NFC transceiver and automatically dialed in by the user's phone. The call establishment request is received, 102, by the communication server CS, which determines, 104, that the further processing of this call request will be performed via the USSD channel, and rejects, 108, the voice connection. Next, the information about the request being serviced is sent, 110, to the authorization system AS, which, after the verification of the user's rights, 112, forwards to the user UR, 116, relevant information about the transaction and a request for transaction authorization with a password. The authorization system AS verifies, 120, the password entered by the user UR, 118, determines, 122, that the user UR has entered all the necessary transaction parameters and determines, 124, whether the transacting party, whose account is to be debited (the user UR in this example) has accepted the transaction amount. If that is affirmative an authorization message is sent to the issuer of the card or to the settlement center, containing instructions to reserve the amount, 126, on user's bank account associated with the card. In the next step, the authorization system AS determines, 128, whether all transaction parameters necessary for transaction settlement have been provided, and, if that is affirmative, forwards, 132, the transaction for settlement.

Example 6

The mobile phone user UR, wants to pay for parking. The proposed method allows the user to pay for the actual parking time, i.e., to activate the service at the time of parking start, and to deactivate it at the time of parking end. The parking transaction identifier is a telephone number. Dialing this number results in a voice call establishment request arriving at the communication server CS, 202, which sends, 204, relevant information about the call establishment request to the authorization system AS. Once the user's rights to authorize the transaction are verified, 206, a decision is made, 212, to perform the authorization via USSD message exchange, and the voice call establishment request is rejected, 218. Then, a request is sent to the user UR, 220, to enter a maximum amount up to which the parking transaction will allowed. The very input of the amount, 222, represents also the transaction authorization. The amount entered is verified, 224, by the authorization system AS, and once the necessary parameters are verified, 226, it is determined whether the user UR has accepted the amount of the transaction, and a message is sent, 230, with instructions to reserve the amount on the telephone account of the user's mobile telephony operator. Next, a verification step is performed, 232, to determine whether all transaction parameters are known. Since the transaction amount entered by the user UR is not the precise transaction amount, which will be determined at a later time based on the actual parking time used, the transaction is stored, 234, in the authorization system AS, as a pending transaction, to be completed and settled when all transaction parameters are known. The actual transaction amount is known after the parking service deactivation: by the user UR at the end of parking period, or by the parking service provider, when the service is deactivated, or by the authorization system AS or the parking service provider, when the maximum amount, provided by the user UR, is exceeded. Once the transaction is completed, it is forwarded, along with the actual amount, for settlement. The maximum transaction amount, entered, 222, by the user UR can be entered as a part of the dialing sequence (part of the number called to invoke the service), by separating the amount parameter from the telephone number with a "*" character "*". For example, for a service telephone number of 1234567 and an amount of PLN 5,50, the actual sequence dialed by the user can have the following form: 1234567*5*50. If the amount parameter is embedded within the dialed number, the request, 220, to enter this parameter, 222, 224, is not utilized.

Example 7

A child, who is a user UR of the service wants to request from the parent, who owns a telephone with the number 1234567, a transfer of PLN 30. The user UR dials parent's phone number on user's mobile phone along with the requested amount, separated by the "#" character. The sequence dialed by the user UR has the following format:

1234567#30. Once the sequence is dialed, a request is sent, 502, to the exchange MSC, which recognizes the special character "#" and sends, 504, a call establishment request to the communication server CS. The communication server CS receives, 102, the voice call establishment request, and, after determining, 104, that the authorization procedure is to be carried out via the USSD channel, rejects, 108, the voice call establishment request, sends, 110, relevant information about the request being serviced to the authorization system AS, which, verifies, 112, user's rights, and transmits to the user relevant information about the transaction along with a request, 116, to accept the transaction. Once the user UR accepts, 118, the transaction and the authorization system AS verifies the acceptance step for correctness, 120, it is determined, 122, whether any other parameters are expected. Next, the authorization system AS verifies, 124, whether the transaction party whose account is to be debited (the parent in this example), has accepted the transaction amount. Since the transaction amount has not been accepted by the party that provides the funds, further verification, 128, is carried out to determine the completeness of transaction parameters. Since the parent has not yet authorized the transaction, the transaction is stored, 130, in the authorization system AS for further processing. To complete the transaction, the parent dials, from parent's phone, a "*" sequence which, as a call establishment request, 502, is sent to the exchange MSC, where it is identified for its special meaning and forwarded, 504, to the communication server CS. Once the communication server CS receives, 102, the call establishment request and it is determined that the authorization is to be carried out via the USSD channel, the voice call establishment request is rejected, 108, and relevant information about the call request is sent to the authorization system AS, which verifies the validity of parent UR, and forwards a USSD message containing information about the pending fund transfer transaction and a request to authorize it with a PIN code. The parent UR enters, 118, the PIN code, which is verified, 120, by the authorization system AS of the bank that maintains the parent's account to be used for settlement and, at the same time the transaction amount is reserved on the account. Once it is determined, 122, that this is the final transaction parameter required from the parent, and determined that the parent has accepted the transaction amount, a message is sent with instructions to reserve the amount, 126, in user's bank account. Then, based on the determination, 128, that the authorization system AS has dealt with all transaction parameters, the transaction is forwarded, 132, for settlement. If, after dialing the "*" sequence, it is discovered that the parent has a plurality of transactions waiting for acceptance, the transactions are successively presented for the acceptance. Also, the parent may pre-select a particular transaction that awaits authorisation, by entering the full number (or a portion thereof) of the transaction in progress. For example, if the child's number is 33344455, then, after by dialing a sequence of 33344455*, the parent will be proposed to authorize a pending transaction coming just from this number. Also, the parent may indicate the transaction amount, e.g., 3334455*20 (for the amount of PLN 20 with the number 333444555), and, if it is different than the amount requested from the indicated number, the authorization system AS sends a relevant message about the discrepancy related to the value of the amount parameter, and the transaction is stored, 130, as a transaction "pending" until the parties agree on the amount.

The presented solution has several advantages over those existing on the market. First, the service can be offered on all networks and with the use of any mobile phone—no special phone software has to be installed. The transaction authorization command is similar to making a telephone call to another person, which is extremely simple for every mobile phone user to do. Transaction parameters may be optionally included in the dialed sequence, preferably separated by the "*" or "#" characters. Also, this solution allows for pre-authorization of the transaction, i.e., a preliminary authorization of the transaction in case some transaction parameters have not been provided yet. Account credit as well as account debit transactions may be authorized. The most important advantage of this solution is the way the transaction parameters are collected separately from each transaction party, and only after successful authorization of the transaction by all the parties involved, the transaction is forwarded for settlement. This approach results in a large degree of flexibility in authorizing transactions of any type.

The invention claimed is:

1. A method for transaction authorization with the use of a mobile phone, comprising the steps of:
  receiving by a communication server (CS) a voice call establishment request to establish a voice connection to a standard MSISDN telephone number which uniquely identifies a transaction;
  determining, by the communication server, whether the voice call establishment request is a request for transaction authorization to be executed with the use of a text channel;
  determining, by the communication server, whether the voice call establishment request is a request for transaction authorization to be continued via a voice channel;
  rejecting the voice call establishment request based on a determination that the voice call establishment request is a request for transaction authorization to be executed with the use of the text channel;
  accepting the voice call establishment request and establishing the voice connection based on a determination that the voice call establishment request is a request for transaction authorization to be continued via the voice channel;
  transmitting, from the communication server (CS) to an authorization system (AS), information about the request, containing at least a telephone number of a user (UR) and the telephone number identifying the transaction;
  transmitting, from the authorization system (AS) to the user (UR), a request to enter necessary transaction parameters;
  receiving the necessary transaction parameters from a handset of the user (UR);
  verifying the correctness and completeness of the transaction parameters received by the authorization system (AS);
  determining that a transaction amount has been accepted by a transaction party responsible for funding the transaction;
  sending a message containing an instruction to reserve sufficient funds in an account of the transaction party to settle the transaction;
  verifying the completeness of all the transaction parameters received by the authorization system (AS); and
  transmitting the transaction for settlement based on successful verification of the completeness of all of the transaction parameters.

2. A method according to claim 1, comprising a step of storing the transaction data for further processing in case of unsuccessful verification.

3. A method according to claim 1, wherein the number identifying the transaction is the number identifying the payee.

4. A method according to claim 1, wherein the number identifying the transaction is the number identifying the electronic point of sale apparatus.

5. A method according to claim 1, wherein the telephone number identifying the transaction is a number identifying a product or a service.

6. A method according to claim 1, wherein in case of rejecting the voice call establishment request, communication between the authorization system (AS) and the user (UR) is facilitated by the communication server (CS) via a SMS channel.

7. A method according to claim 1, wherein in the case of rejecting the voice call establishment request, communication between the authorization system (AS) and the user (UR) is facilitated by the communication server (CS) via a Unstructured Supplementary Service Data (USSD) channel.

8. A method according to claim 1, wherein the method further comprises:
   once the communication server (CS) receives the voice call establishment request, transmitting by the communication server (CS) information about the voice connection to the authorization system (AS),
   performing by the authorization system (AS) a verification of credentials of the user (UR); and
   when the verification of the credentials of the user is not completed successfully, sending by the authorization system (AS) an instruction to the communication server (CS) to establish the voice connection, in which a message is played explaining the reasons for unsuccessful verification.

9. A method according to claim 1, wherein:
   once the communication server (CS) receives the call establishment request, the communication server (CS) determines a type of the connection to be used for a transaction authorization;
   transmitting by the communication server (CS) information about the voice call establishment request to the authorization system (AS); and
   when the verification step is not completed successfully, sending by the communication server (CS) a message to the user (UR) with an explanation of the unsuccessful verification.

10. A method according to claim 1, wherein one of the transaction parameters requested by the authorization system (AS) and entered by the user (UR) is a password of the user.

11. A method according to claim 10, wherein the password is an explicit authorization of the transaction.

12. A method according to claim 10, wherein an authentication of the user (UR) is requested by the authorization system (AS) from an external user funds management system.

13. A method according to claim 1, wherein one of the transaction parameters requested by the authorization system (AS) and received from the user (UR) is an explicit authorization of the transaction.

14. A method according to claim 1, wherein once the voice connection is established, communication with the user takes place with the use of DTMF technology.

15. A method according to claim 1, wherein once the voice connection is established, communication with the user takes place with the use of voice communication and speech recognition technology.

16. A method according to claim 1, wherein some of the transaction parameters are encoded in the standard MSISDN telephone number that identifies the transaction.

17. A method according to any one of claims 1 and 16, wherein the user (UR) has a handset with the contactless technology, and the telephone number that identifies the transaction is read remotely from a contactless chip or an electronic emitter.

18. A method according to any one of claims 1 and 16, wherein the user (UR) has a handset with a software application that recognizes and processes barcodes and that application obtains the telephone number identifying the transaction encoded in the barcode.

19. A method according to any one of claims 1 and 16, wherein the user (UR) has a handset supporting wireless near field communication network, and the telephone number that identifies the transaction is transmitted to the user's telephone via this network.

20. A method according to claim 1, wherein instead of rejecting the voice call establishment request, the voice connection is established, and finished after a specified time period.

21. A telecommunications network comprising:
   a communication server (CS); and
   an authorization system (AS);
   wherein the communication server (CS) adapted to:
      receive a request to establish a voice call to a standard MSISDN telephone number, the telephone number identifying the transaction;
      determine whether the request to establish the voice call is a request for executing an authorization procedure via a text channel;
      determine whether the request to establish the voice call is a request for continuing the authorization procedure via a voice channel;
      reject the voice call establishment request based on a determination that the request to establish the voice call is a request for executing an authorization procedure via a text channel; and
      accept the request and to establish the voice call based on a determination that the request to establish the voice call is a request for continuing the authorization procedure via a voice channel;
   wherein the communication server (CS) is further adapted to send, to the authorization system (AS), information about the request to establish the voice call, containing at least a telephone number of the user (UR) and the telephone number identifying the transaction;
   wherein the authorization system (AS), communicating with the communication server (CS), is adapted to:
      send a request to a user (UR) to enter necessary transaction parameters; and
      receive from a handset of the user a call establishment request, and the necessary transaction parameters;
      verify the correctness of the received transaction parameters; and
      forward the transaction for settlement based on successful verification of the received transaction parameters.

22. A telecommunications network according to claim 21, wherein the acquisition of the transaction parameters is executed over the voice channel.

23. A telecommunications network according to claim 21, wherein the authorization system (AS) receives the transaction parameters over an Unstructured Supplementary Service Data (USSD) channel.

24. A telecommunications network according to claim 21, wherein the authorization system (AS) receives the transaction parameters via SMS messages.

25. A telecommunications network according to claim 21, wherein the communication server (CS) is a portion of the authorization system (AS).

26. A method according to claim 1, wherein some of the transaction parameters are included in the telephone number that uniquely identifies the transaction.

\* \* \* \* \*